Nov. 5, 1968  H. J. THOMISZER  3,409,367
APPARATUS FOR MAKING PRINTS
Original Filed July 31, 1962  5 Sheets-Sheet 1
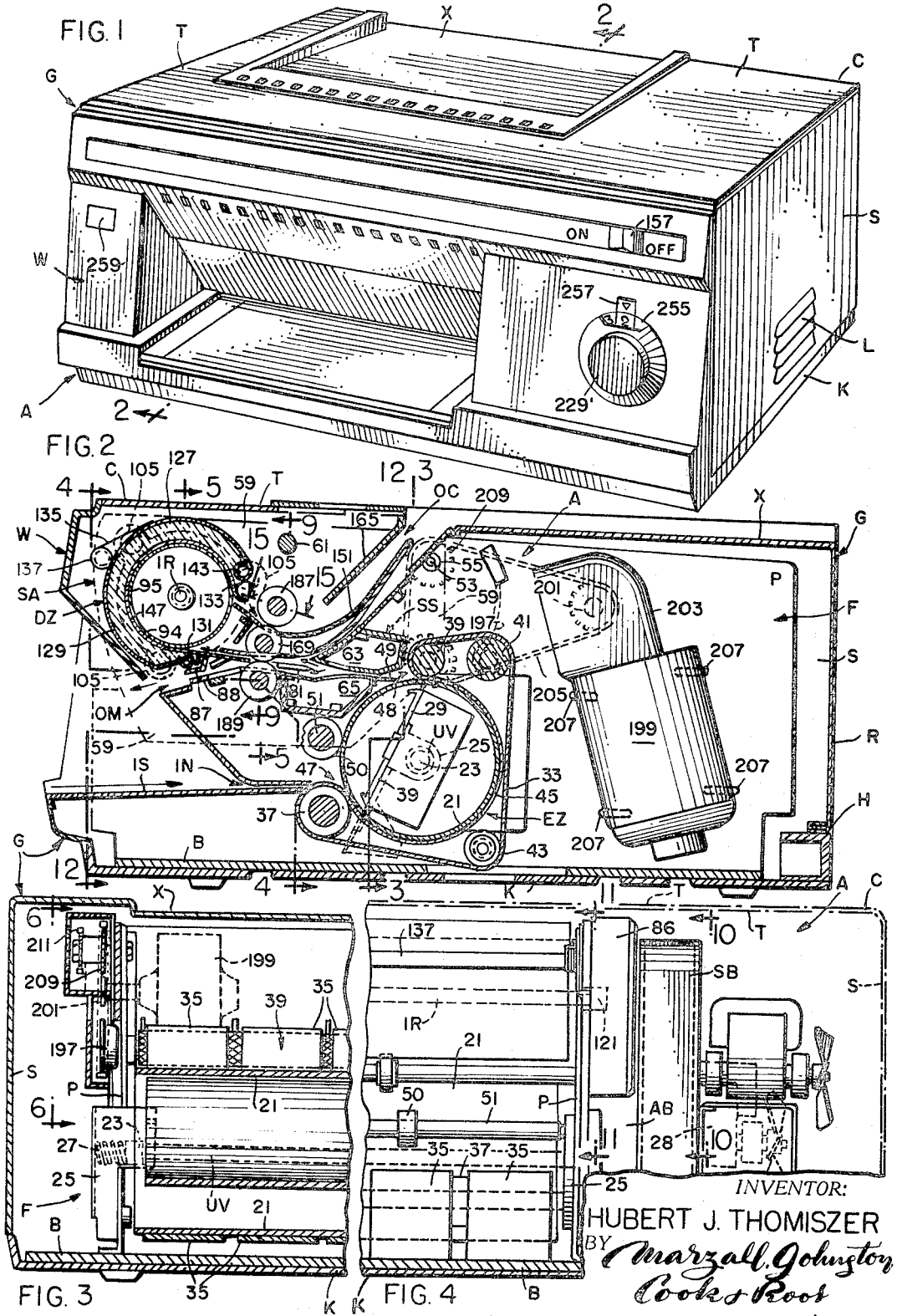
INVENTOR:
HUBERT J. THOMISZER
BY Marzall, Johnston, Cook & Root
ATT'YS

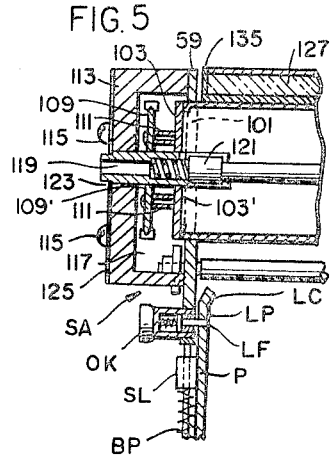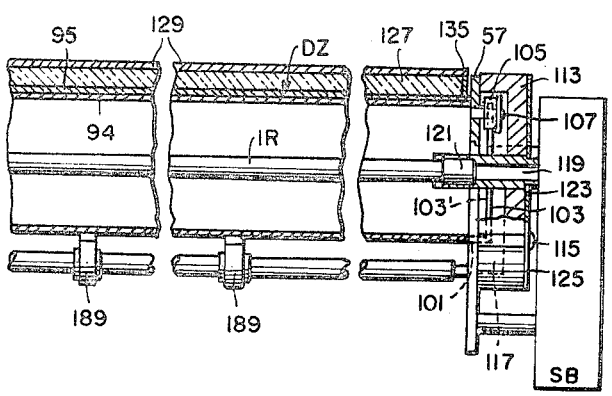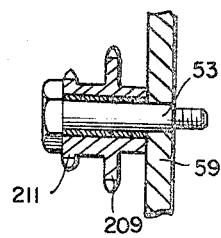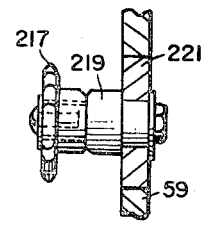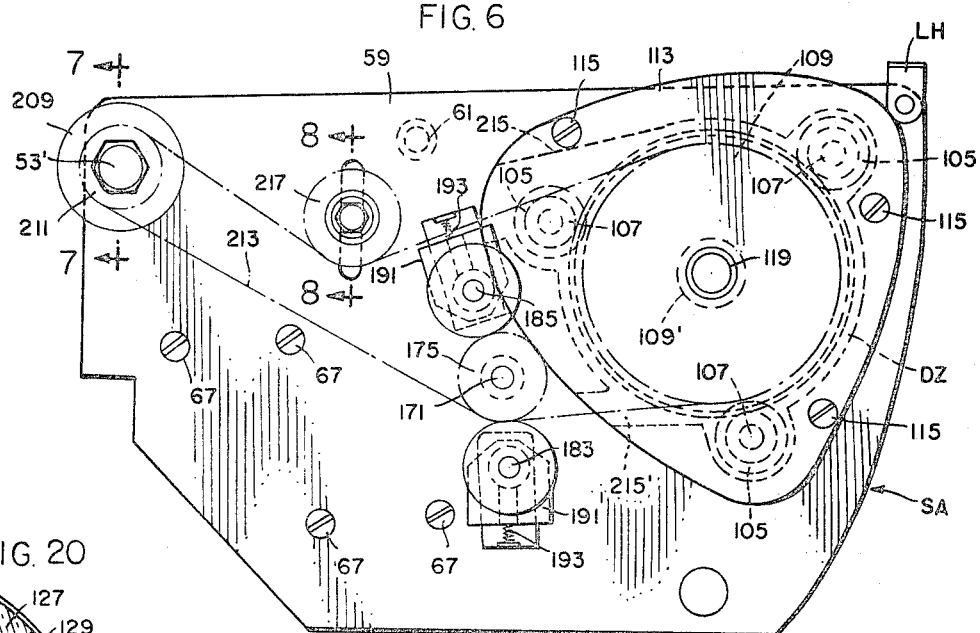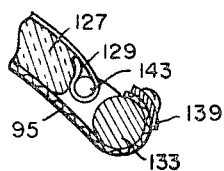

Nov. 5, 1968　　　H. J. THOMISZER　　　3,409,367
APPARATUS FOR MAKING PRINTS
Original Filed July 31, 1962　　　5 Sheets-Sheet 3
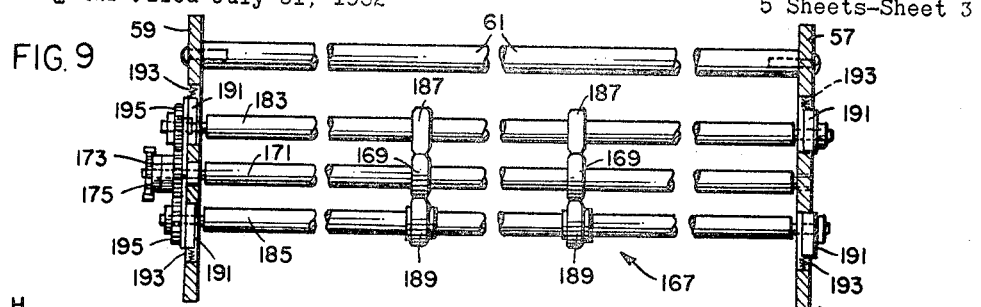
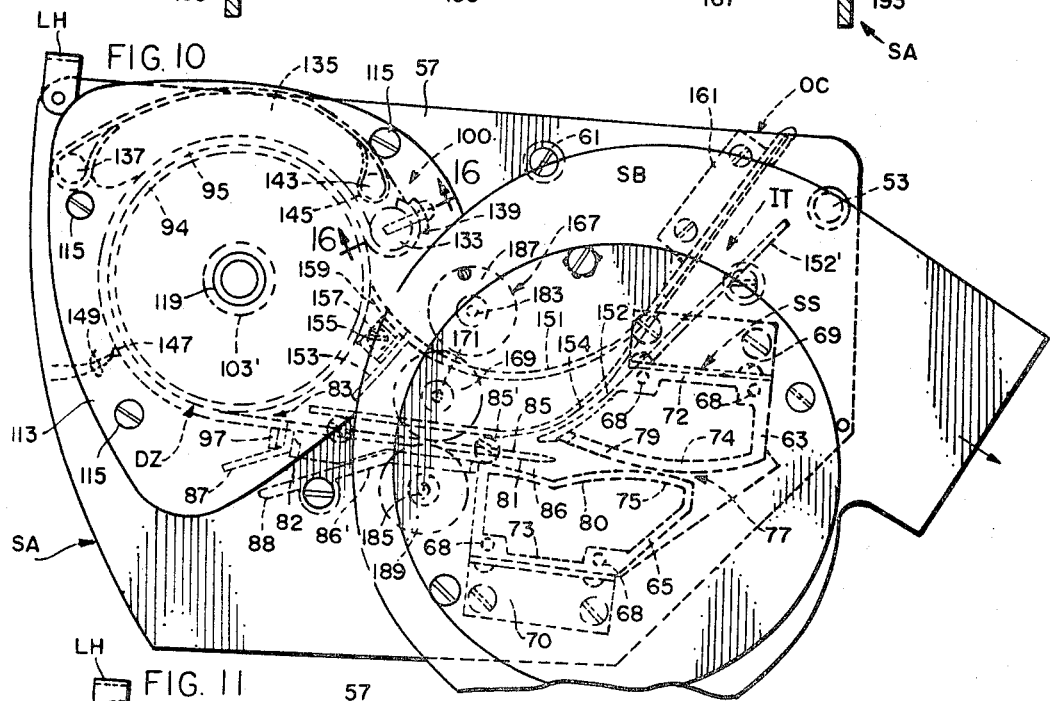
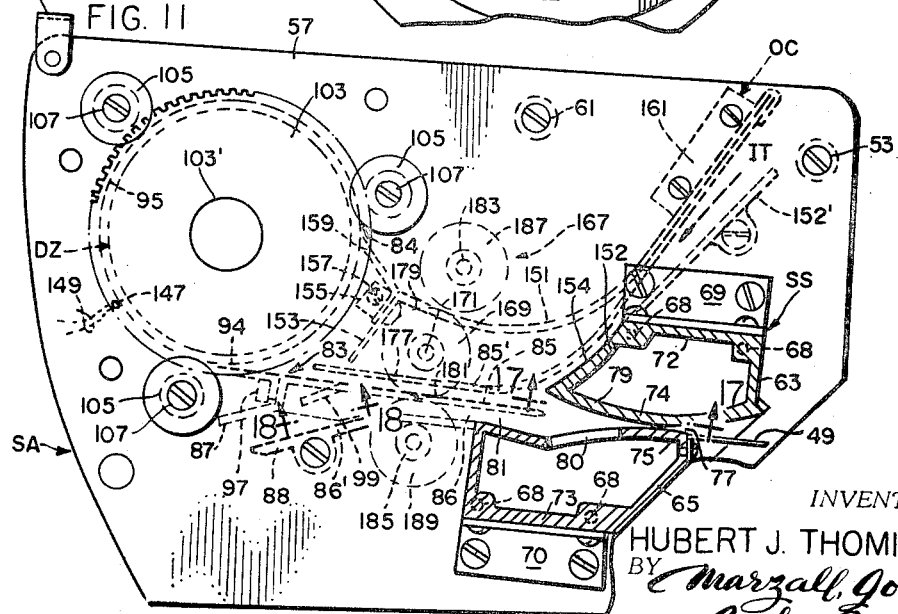
INVENTOR:
HUBERT J. THOMISZER
BY Marzall, Johnston,
Cook & Root
ATT'YS Nov. 5, 1968   H. J. THOMISZER   3,409,367
APPARATUS FOR MAKING PRINTS
Original Filed July 31, 1962   5 Sheets-Sheet 4

INVENTOR:
HUBERT J. THOMISZER
BY
Marzall, Johnston, Cook & Root
ATT'YS

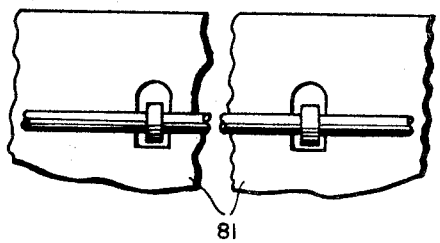
FIG. 15
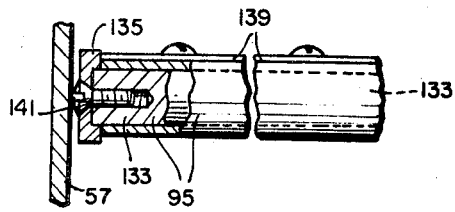
FIG. 16
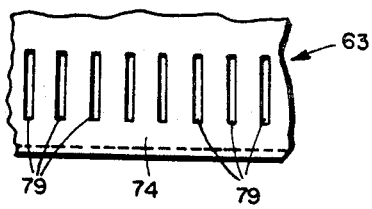
FIG. 17
FIG. 18
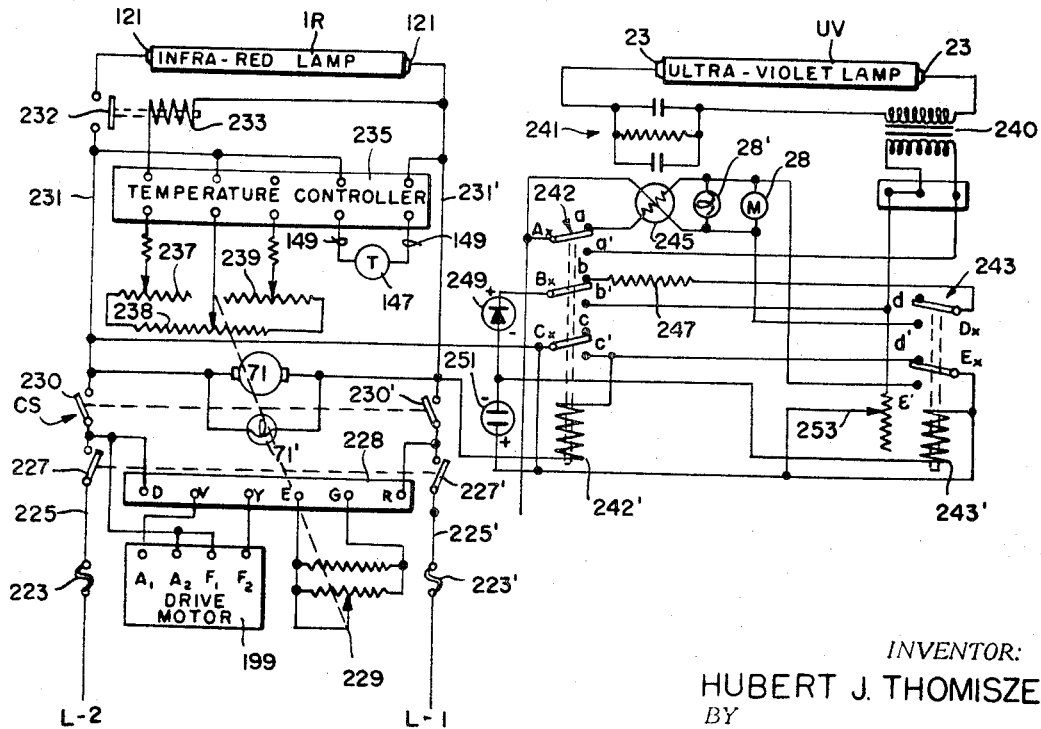
FIG. 19

United States Patent Office 3,409,367
Patented Nov. 5, 1968

3,409,367
APPARATUS FOR MAKING PRINTS
Hubert J. Thomiszer, Skokie, Ill., assignor to Eugene Dietzgen Co., Chicago, Ill., a corporation of Delaware
Original application July 31, 1962, Ser. No. 213,630, now Patent No. 3,224,355, dated Dec. 21, 1965. Divided and this application July 26, 1965, Ser. No. 474,908
6 Claims. (Cl. 95—75)

ABSTRACT OF THE DISCLOSURE

The apparatus is for making diazo and like prints with ultraviolet exposure section and heat (infrared) developing section. A belt system holds the graphic and copy sheets against exposure roller and developer roller. There is ready access mounting of developing unit and vacuum sheet-separating device. A control device is present for maintaining the developing zone at desired developing temperature. An electrical control circuitry is used for regulating ultraviolet lamp and infrared lamp, including delay timing relay with U/V lamp. The speed control of drive motor includes apparatus to regulate the speed of sheet movement as function of the adjusted operating temperature of the heater.

---

This application comprises a division of an application Ser. No. 213,630, filed July 31, 1962, for Apparatus for Making Prints, now U.S. Patent No. 3,224,355.

The present invention relates in general to the production of copies of graphic material, such as typewritten and other written or printed material, photographs, drawing, tracings, sketches, memoranda and the like, and more especially to apparatus for the production of copies upon ray sensitive copying sheets.

In particular, the invention refers to apparatus for the production of copies by a process based upon the circumstance that diazo compounds decompose, when exposed to the action of ultraviolet light, to produce materials which are and which thereafter remain essentially colorless, together with the further circumstance that diazo compounds may also be combined with other essentially colorless materials, called couplers, to produce intense azoic dyes which are insensitive to light and which hence are capable of forming permanent visible images. The invention contemplates the rapid production of diazotype copies of graphic material, directly from an original or master to be reproduced, by merely forming an exposure sandwich, comprising the master to be reproduced and a sensitized copying sheet in superposed or stacked relation, and then exposing the sandwich to radiation containing ultraviolet rays, such as are emitted by conventional mercury vapor lamps, or other light source containing ultraviolet rays. The rays are applied upon the copying sheet through the master to thereby deactivate the sensitive material of the copying sheet everywhere except in areas corresponding with and screened by the graphic material to be reproduced. The exposed copying sheet is then heated to cause the dye producing reaction in such screened areas to thus develop, in the copying sheet, a visible copy of the graphic material contained in the master. The production of copies, in accordance with the teachings of the present invention, entirely avoids the time delay and inconvenience normally encountered in copying procedures requiring the successive exposure of the copying sheet to light, through the master to be reproduced, followed by the immersion of the copying sheet in a liquid developing medium.

An important object of the present invention is to eliminate the necessity of using liquid developers in making copies of graphic material; a further object being to produce copies in developed condition merely by exposing a sensitive copying sheet to the action of ultraviolet light applied thereto through a master to be reproduced and heating the copying sheet to develop the same as a print.

Another important object is to provide for copying a graphic master by exposing a copying sheet selectively to the action of heat and of diazo destroying or inactivating radiations in order to produce developed diazo images in highly visible and completely stable condition in areas corresponding with graphic material to be copied, while converting the light sensitive compound to inert, colorless, and hence invisible condition in other areas of the sheet, the sheet containing a light sensitive diazo compound together with essentially colorless materials, called couplers, and a heat activatable diazo developing medium, such as urea, adapted to decompose when heated above a critical temperature and thereby evolve an alkaline diazo developing medium, such as ammonia.

Another important object is to provide apparatus for delivering a copying material successively past radiation sources of light containing diazo destroying ultraviolet rays and of heat for diazo development.

Another important object is to provide apparatus for delivering a copying sheet and superposed master to be copied past a suitable light source containing diazo destroying ultraviolet rays, and for then separating the master from the exposed copying sheet and discharging the master directly from the apparatus while delivering the copying sheet therefrom after exposing the same to the developing action of heat.

Another important object is to provide apparatus of the character mentioned wherein a rotatable sleeve of material, such as glass, that is transparent to ultraviolet light is employed, in conjunction with flexible belt means having a bight embracing the peripheral surface of the sleeve, to travel an exposure sandwich comprising a master to be reproduced and a sensitive copying sheet past a source of ultraviolet light; a further object being to employ a conventional tubular ultraviolet lamp disposed within and coaxially of the sleeve as the light source.

Another important object of the invention is to provide a thermographic copying sheet developer embodying sheet heating means comprising a turnable sleeve, of material such as aluminum, that is capable of absorbing infrared rays, in conjunction with means for holding a sheet to be heated upon the sleeve during a desired sheet heating interval required for the development of the sheet; a further object being to employ a belt or web having a portion forming a bight embracing and resiliently engaging the periphery of the sleeve between a sheet receiving and a sheet discharging station spaced apart circumferentially of the sleeve; a further object being to provide a relatively thick layer of heat insulation outwardly of said belt in order to retain developing heat in the developing zone defined by and between said belt and the facing surfaces of the sleeve; yet another object of the invention being to heat the sleeve by means of a conventional tubular infrared ray lamp disposed within and coaxially of the ray absorbing sheet heating sleeve.

Another important object is to provide apparatus of the character mentioned comprising a pair of spaced apart rotatable sleeves defining exposure and developing zones or stations in the apparatus, including means for guiding an exposure sandwich to and around the sleeve forming the exposure zone and for then separating the sandwich and delivering its copying sheet component to and guiding the same around the sleeve forming the developing zone, and including guiding means for discharging the master component of the sandwich from the apparatus, adjacent the sheet receiving station of the developing zone, and sheet guiding means for delivering the developed copying sheet outwardly of the apparatus at the discharge side of the developing zone; a further object being to provide a set of drivingly interconnected roller members for delivering the master outwardly of the apparatus while transferring the exposed copying sheet to the sheet receiving side of the developing zone, and for delivering the developed sheet outwardly of the apparatus at the discharge side of the developing zone; a still further object being to provide vacuum actuated sandwich component separating means for stripping the master component from the exposed sensitive sheet as the same are delivered from the exposed zone; a still further object being to provide a pair of vacuum chambers disposed on opposite sides of the path of travel of the exposure sandwich as the same is delivered from the exposure zone to separate the sandwich components and deliver the same upon opposite sides of a partition and between sheet transporting rollers for the delivery of the master component outwardly of the apparatus while transferring the copying sheet component to the developing zone.

Another important object is to assemble the means forming the sheet developing zone as a unit supported for pivotal movement with respect to the apparatus forming the sheet exposure zone, said unit being latchable in operative position with respect to the exposure zone and being swingable to a retracted or elevated position permitting ready access to the apparatus forming both zones, to thereby facilitate repair, replacement and adjustment thereof; a further object being to include sandwich component separating means and associated sheet guiding and traveling means in the latchable and relatively shiftable assembly unit along with the components forming the developing zone; a still further object being to drivingly turn the sleeve forming the exposure zone as well as the sleeve forming the developing zone and the associated sheet traveling rollers from a drive shaft disposed in coaxial alinement with the axis about which the shiftable assembly unit embodying the developing zone is pivotally mounted, whereby the sheet traveling means associated with both the exposure and the developing zones may be driven by common motive means, such as an electric motor mounted in the apparatus.

Among other important objects of the invention is the provision of exhaust means for maintaining desired vacuum conditions in the sandwich component separator; the provision of means for ventilating the exposure zone to assure that the same be maintained at a temperature level sufficiently low to inhibit development of the heat sensitive copying sheet, as a sandwich containing the same is passed through the exposure zone; the provision of control means for maintaining the developing zone at an appropriate developing temperature within close limits; the provision of electrical control circuitry for regulating the operation of the ultraviolet ray lamp of the exposure zone and the infrared ray lamp which energizes the developing zone, and for controlling the speed of the drive motor.

The foregoing and numerous other important objects, advantages and inherent functions of the invention will become apparent as the same is more fully understood from the following description, which, taken in connection with the accompanying drawings, discloses a preferred embodiment of the invention.

Referring to the drawings:

FIG. 1 is a perspective view of apparatus embodying the present invention;

FIG. 2 is a sectional view taken substantially along the line 2—2 in FIG. 1;

Figure 12:
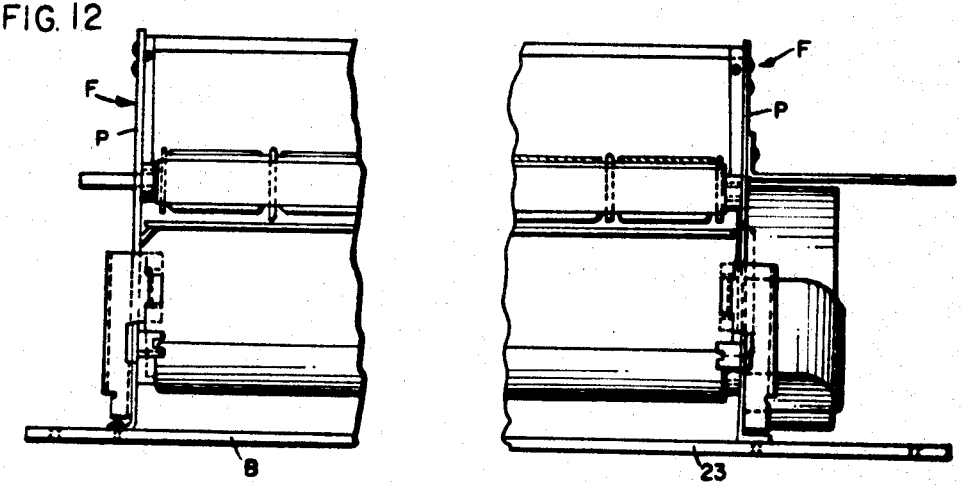
Figure 13:
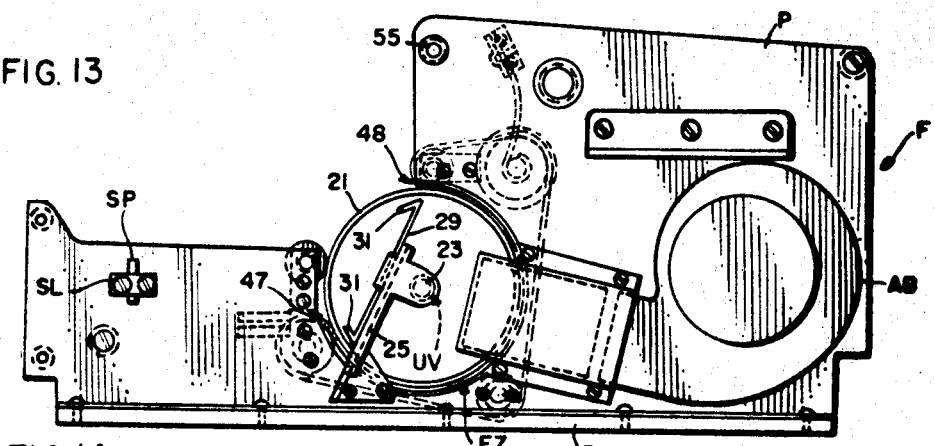
Figure 14:
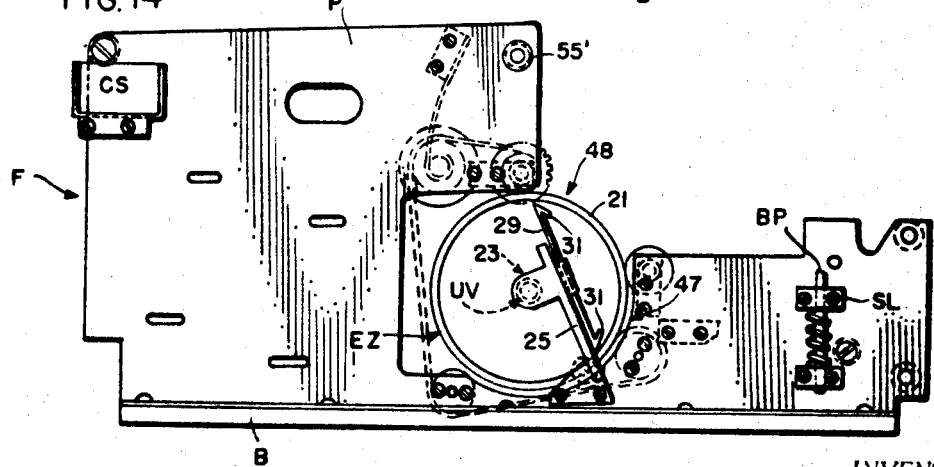

FIGS. 3, 4, 5, 9, 12 and 15 are sectional views taken respectively substantially along the lines 3—3, 4—4, 5—5, 9—9, 12—12 and 15—15 in FIG. 2;

FIGS. 6, 10 and 11 are sectional views respectively taken substantially along the lines 6—6, 10—10 and 11—11 in FIGS. 3 and 4;

FIGS. 7 and 8 are sectional views respectively taken substantially along the lines 7—7 and 8—8 in FIG. 6;

FIGS. 13 and 14 respectively are right and left side views of the structure shown in FIG. 12;

FIG. 16 is a sectional view taken substantially along the line 16—16 in FIG. 10;

FIGS. 17 and 18 respectively are sectional views taken substantially along the lines 17—17 and 18—18 in FIG. 11;

FIG. 19 is a diagram of electrical components and circuitry embodied in the apparatus; and FIG. 20 is an enlarged sectional view of a portion of the apparatus.

To illustrate the invention the drawings show apparatus A for the production of copies of graphic material upon sensitive sheet material comprising a web, as of paper or other suitable sheeting, having coated thereon a sensitive composition that is convertible to stable, colorless condition upon exposure to radiation containing ultraviolet rays, said composition being also convertible to highly visible, inert and stable condition upon exposure to heat at temperatures of the order of 300° F. While the sensitive coating may comprise any suitable substance having the foregoing characteristics, a diazo compound and an azo dye coupling component, together with a substance, such as urea, which produces an alkaline diazo dye-producing reaction when heated at temperatures of the order of 300° F., may be used.

In making a copy of an original or master having graphic markings or characters imprinted or otherwise applied upon a surface thereof, the present invention contemplates the formation of an exposure sandwich by stacking the master upon a sensitive copying sheet, with the rear face of the master applied upon the light sensitive layer carrying surface of the copying sheet. The exposure sandwich may then be subjected to the action of ultraviolet light rays, in manner causing the radiation to impinge upon the sensitive material of the copying sheet through the master, to thereby render inert all of the sensitive material of the copying sheet, except that disposed in the areas thereof corresponding with and screened by the graphic material to be reproduced. The unmodified sensitive material then remaining in such screened areas form latent images of the graphic material to be copied, which latent images are adapted for development to inert, highly visible condition in response to the application of heat to the so exposed copying sheet. After exposure of the sandwich to the action of ultraviolet radiation, the sandwich components may be separated and the exposed copying sheet may be subjected to the action of heat at a temperature sufficiently high to develop the sensitive material forming the latent images in the screened areas of the copying sheet.

To these ends, the copying apparatus of the present invention may comprise a main frame F embodying a base plate B, and spaced apart side plates P supported on said base plate, the printing apparatus embodying instrumentalities mounted on and carried by said frame F and forming thereon an exposure zone EZ, a developing zone DZ, and sheet receiving, conveying and discharging mechanism for delivering an exposure sandwich into and traveling the same through the exposure zone and thence to a sandwich component separating device SS, the sheet conveying mechanism, in conjunction with the separating device SS, being operable to discharge the master component of the sandwich from the apparatus, while delivering the exposed sensitive sheet component to and through the developing zone and thence from the apparatus as a finished copy.

The apparatus preferably includes a suitable housing G, as of sheet metal, supported on the frame means F in position enclosing the operating components of the print producing apparatus, said housing preferably comprising a floor portion K upon which the main frame F and the base plate B are secured, a front wall W secured on and extending upwardly of the floor portion, and a hinged cover C pivotally connected with and along the rear edge of the floor K, as by means of a hinge H, the cover having a rear wall R, a top wall T and dependent side walls S adapted to enclose the rear, top and sides of the apparatus, and providing ready access to the enclosed print producing mechanism for inspection, repair, replacement or adjustment. The housing G is also formed with suitable inlet and outlet slots or openings, including an inlet slot IN in the front wall W through which an exposure sandwich may be introduced and guided to the apparatus forming the exposure zone EZ, a delivery opening OM, which may also conveniently be formed in the front wall, above the inlet slot IN, and through which the master being copied may be ejected from the apparatus, and a delivery slot OC, in the top wall T, through which finished copies may be discharged from the copying machine.

The front wall W of the housing may also be formed with a flat transversely extending shelf IS in front of and leading to the inlet slot IN to aid in delivering exposure sandwiches into and through said inlet slot, said shelf and slot being preferably disposed at the front of the apparatus beneath the opening OM through which the master component of the sandwich is ejected after the sandwich has traversed the exposure zone. The housing G is also preferably formed with a flat upwardly facing and transversely extending tray portion X in the rearward portions of the top wall T of the hinged cover C, in position to receive finished prints ejected through the print delivery opening OC. This delivery opening constitutes the discharge outlet of a print guiding channel which opens through the top of the cover C, in a rearwardly inclined direction, to discharge the finished prints upon the tray X remote from the sandwich inlet slot IN and also remote from the opening OM through which the master component of the sandwich is ejected. Suitable latching may, of course, be provided for securing the cover in closed position on the frame F.

The apparatus forming the exposure zone EZ may comprise a tubular sleeve 21 supported on the frame F within the housing G for rotary movement about its axis. The sleeve preferably comprises glass, plastic or other material that is transparent to ultraviolet rays. The sleeve 21 may be supported for turning movement in any suitable, preferred or convenient fashion, and a rapid start ultraviolet ray emitting lamp UV, of elongated tubular configuration and having connection electrodes 23 at its opposite ends, may be supported within and in coaxial alinement with respect to the sleeve 21. As shown, the opposite ends of the tubular lamp UV may be supported in brackets 25 secured on the side plates P of the main frame, said opposite ends being preferably resiliently mounted in the brackets, as by means of helical mounting springs 27. A cool air blower AB, driven by an electric motor 28, may be mounted on a frame panel P in position to blow air through the sleeve 21 from one end thereof, the housing walls S being provided with louvers L to permit cooling air to enter and leave the housing.

A reflector or mirror 29, which may comprise an elongated plate of polished aluminum having longitudinally extending strengthening flanges 31 along its opposite side edges, may be fastened at its opposite ends on the brackets 25 in position extending therebetween and through the sleeve on one side of the lamp UV. Endless flexible belt means 33 may be employed to support the sleeve 21 for turning movement about its axis. Such belt means may conveniently comprise a plurality of endless belt elements 35 disposed in parallel relation, spaced apart axially of the sleeve and carried on guide rollers 37, 39, 41 and 43. The belt elements form sleeve embracing bights 45 between the rollers 37 and 39, said bights extending in engagement with a portion of the surface of the sleeve subtending an angle of the order of 240°, at the axis of the sleeve. The rollers may be journaled at their opposite ends for turning movement on the side plates P of the main frame. The rollers 37 and 39 may be disposed respectively in position to deliver the belt elements upon and to guide the same from the sleeve, thereby defining a sandwich receiving station 47 at the inner end of the entrance slot IN, and a sandwich delivery station 48. A sandwich stripping blade 49, extending longitudinally of the sleeve 21 and having a knife edge bearing thereon, is preferably provided at the station 48 for assuring separation of the sandwich from the sleeve as the sandwich is delivered from between the sleeve and the bight portions of the belt elements, at the roller 39.

The reflector 29 is preferably supported within the sleeve 21 with the opposite side edges of the reflector disposed radially inwardly of the rollers 37 and 39 in position extending between and substantially in alinement with the inlet and outlet stations 47 and 48. As a consequence, substantially all of the radiation emitted by the lamp UV will be applied either directly or by reflection from the mirror 29 through the portions of the transparent sleeve 21 that are in engagement with the bight portions of the belt elements between the rollers 37 and 39, thereby constituting such area as an exposure zone in which the sensitive copying sheet component of an exposure sandwich may be exposed to the action of ultraviolet radiation from the lamp UV, applied through the transparent sleeve 21 and through the original or master component of the sandwich, as the sandwich is carried by and between the sleeve and the belt elements between the sandwich receiving and sandwich delivery stations 47 and 48. Holding rollers 50, axially spaced on a supporting shaft 51 journaled at its opposite ends in the plates P, may be provided in position to bear upon the surface of the sleeve, between the rollers 37 and 39 and remote from the bights 45 of the belt elements 35, in order to aid in supporting the sleeve 21 for rotation about its axis by the bights of the belt elements.

The apparatus forming the developing zone DZ, the sandwich component separating apparatus SS and the associated sheet traveling mechanism preferably comprise a sub-assembly carried on a frame SA mounted for swinging movement about an axis defined by pivot pins 53 supported in embossments or bushings 55 formed in the frame plates P above the exposure zone EZ. The frame SA may comprise a pair of spaced apart plates 57 and 59 preferably made of Formica or other heat resistant material and secured together in spaced relation, as by means of a bracing and spacing rod 61 extending between and secured at its opposite ends to the plates. Also extending between and secured at their opposite ends to the plates 57 and 59 are a pair of elongated vacuum chambers 63 and 65, which may conveniently comprise extruded aluminum tubes disposed in closely spaced parallel relation in position extending transversely between the plates 57 and 59. On one side of the sub-assembly frame SA, the open ends of the tubular vacuum chambers 63 and 65 may be abutted against, sealed upon and secured to the inner face of the side plate 59, as by means of suitable fastening screws 67 penetrating the plate and threadedly engaging in holes 68 formed in the ends of the tubes. At their opposite ends the tubular vacuum chambers may extend through openings in and open outwardly of the frame plate 57 for connection with a suction pump or blower SB, which may be mounted upon the outer face of the plate 57 with the suction side of the blower surrounding, enclosing and in communication with the open ends of the tubular suction members, suitable mounting brackets 69 and 70 being employed to anchor the projecting ends of the chambers 63 and 65 upon the frame plate 57. An electric motor 71 may be provided for driving the blower SB.

The vacuum chambers 63 and 65 are each sectionally configurated to provide relatively flat walls 72 and 73 to facilitate the attachment of the members on the mounting brackets 69 and 70. The tubular vacuum members 63 and 65 are also formed with preferably curved side walls 74 and 75, the members being mounted in position with said curved walls in facing relationship and closely spaced apart on one side of the members to form a sandwich receiving slot 77 therebetween at and facing the sandwich delivery station 48, the sandwich stripping and guiding blade 49 being preferably secured on the member 65 in position forming a continuation of its curved wall 75, to thereby assure delivery of an exposure sandwich into the receiving slot 77 of the sandwich component separating means SS.

The curved walls of the suction chambers 63 and 65 diverge mutually outwardly away from the entrance slot 77; and the slot remote portions of said curved walls are formed respectively with slits 79 and 80 extending therethrough in longitudinally spaced relation throughout the portions of the suction chambers which extend between the frame plates 57 and 59, the slits 79 formed in the wall 74 of the member 63 being shown more particularly in FIG. 16 of the drawings; and it should be understood that the slits 80 in the wall 75 of the member 65 are like the slits 79 in size, configuration and spacement.

As an exposure sandwich passes through the slot 77 and over the outer faces of the walls 74 and 75 of the vacuum chambers 63 and 65, the copying sheet and master components of the sandwich will respectively be drawn to and passed along the diverging surfaces of the walls 74 and 75 by suction exerted upon the sandwich components through the slits 79 and 80 by virtue of the reduced pressure conditions maintained within the tubular vacuum chambers, by operation of the suction pump SB. As a consequence, the components of an exposure sandwich will be progressively separated one from the other as the sandwich is fed through the slot 77 and over the divergent walls 74 and 75 of the sandwich separating apparatus.

To maintain the components in separated condition, the structure may include a transversely extending partition 81 secured at its opposite sides on the frame panels 57 and 59, said partition having a forward edge extending medially between the sides of the curved walls 74 and 75 remote from the inlet slot 77, and a flanged end 82 extending at the sheet receiving station 83 of the developing zone DZ. In passing from the curved walls 74 and 75, the separated sandwich components will be delivered upon opposite sides of the partition 81 and into guide channels 85 and 86 defined on opposite sides of the partition 81 by suitable wall members 85' and 86'. These guide channels 85 and 86 respectively serve to guide the exposed copying sheet to and to deliver the same at the sheet receiving station of the developing zone DZ, while delivering the master component of the sandwich through the discharge outlet OM. To these ends, the wall members 85' and 86' preferably extend between and are secured at their opposite sides on the frame panels 57 and 59 in generally parallel spaced relation with respect to the partition 81. In this connection, the leading edge portions of the wall member 86' may abut the back of the suction member 65 and form a continuation of the sandwich separating wall 75. Remote from the suction member the wall member 86' and the partition 81 may both be formed respectively with inclined portions 87 and 88 communicating with the discharge outlet OM.

The sheet developing apparatus forming the developing zone DZ may comprise a pair of relatively movable sheet guiding and moving components 94 and 95, means being provided for heating at least one of the components in order to condition it for the delivery of sheet developing heat to the copying sheet as the same is transported between the components from the sheet receiving station 83 to a delivery or discharge station 84 spaced from the receiving station circumferentially of the sleeve. To this end, means may be provided for heating the component 94 which, as shown, may be formed as a continuously turnable cylindrical sleeve of aluminum or other suitable heat transmitting material, while the component 95 may comprise a strip or web of material forming a bight in embracing contact with the peripheral surfaces of the sleeve forming the component 94.

The strip of material or web forming the component 95 may be anchored at one end upon a seat formed on the flanged end 82 of the partition 81 at the inner end of the inclined master component guiding portion 87, the partition 81 extending from the sandwich component separating members 63 and 65 in a direction substantially tangential with respect to the sleeve 94. The anchored end of the web 95 may be secured on its seat, as by means of a clamping block 97 bolted or otherwise secured on the seat. The partition 81 may also be formed, adjacent its offset seat forming portion, with inclined fingers 99 stuck outwardly from the material of the partition for the purpose of guiding the separated master component of the sandwich between the inclined ends 87 and 88 of the partition 81 and wall 86', to prevent the master from getting caught or snagged on said offset seat forming portion of the partition.

From its anchored end, the web 95 may extend around and in contact with the outer surfaces of the sleeve 94, the opposite end of the web extending to the delivery station 84 and being connected with yielding support means 100 for snugly yet yieldingly pressing the web upon the surfaces of the sleeve. The web thus may form a bight which preferably embraces sleeve surfaces subtending an angle of the order of 240°, about the axis of the sleeve. The sleeve 94 may be and preferably is provided with a black coating upon its inner surface to constitute the same as a black body capable of absorbing heat readily from any heat source disposed within the sleeve.

The component 95 may comprise any suitable heat resisting web material, such as woven glass fabric impregnated with Teflon or similar synthetic plastic material, to form a heat resistant web of adequate strength. Since the surface of a woven fiberglass fabric web is not entirely smooth even when impregnated with Teflon, it is desirable to provide the web 95 with a lining or layer of pure Teflon or like plastic upon its sleeve facing surface, so that a copying sheet, introduced between the sleeve and the web, at the sheet receiving station 83, may travel thence between the outer surface of the sleeve and the smooth sleeve facing surface of the pure Teflon lining layer, because of the frictional differential between the metal cylinder and the plastic belt.

Teflon, and other plastic materials having like characteristics, forms a heat reservoir because of its low thermal conductivity. It is also substantially gas impervious, and is hence well adapted for use in apparatus for transporting sheet material while exposing the same to the action of developing gases produced therein when heated. Because of its impervious nature, Teflon is adapted to retain, in the transported sheet, any and all gases that may be evolved therein by heat during movement of the sheet between the web and sleeve, which, of course, is also relatively impervious to gas penetration. As a consequence, the illustrated mechanism may be employed for developing permanently visible images in sensitive diazo-type sheet material, merely by heating the same to evolve gases adapted to accomplish the desired image developing reaction.

As shown more particularly in FIG. 5 of the drawings, the frame plates 57 and 59 may be formed with alined openings 101 sized to freely receive the opposite ends of the sleeve 94 for turning movement therein, said opposite ends of the sleeve extending through said openings and outwardly of the frame plates, and being formed with inturned peripheral flanges or other suitable means for the attachment of heat insulating shields in the form of end plates 103, as of glass filled Formica or other heat resistant material, which may be secured to the opposite ends of the sleeve 94, as by means of suitable fastening studs securing the plates upon the inwardly turned peripheral end flanges of the sleeve.

The sleeve 94 may be mounted for turning movement on the frame plates 57 and 59 by means of bearing rollers 105 mounted for turning movement on axle pins 107 secured in the frame plates 57 and 59 to support the rollers 105 upon the outwardly facing surfaces of said plates, in position to rollingly engage the peripheral edges of the end plates 103, three rollers 105 equally spaced around the circumference of the plates 103 being preferably provided at each of the opposite ends of the sleeve 94. The end plate 103 that is turnably supported upon the frame plate 59 carries a sleeve driving gear 109 connected therewith, as by means of spacing studs 111; and preferably foamed polyurethane heat insulating covers 113 may be secured upon the outer surfaces of the frame plates 57 and 59, as by means of fastening studs 115 in position enclosing the projecting ends of the sleeve 94, the end plates 103, the roller bearing wheels 105 and the driving gear 109, said heat covers providing cavities 117 for snugly enclosing said components while permitting the same to turn freely.

The end plates 103 and the plate forming the driving gear 109 are formed with central openings 103' and 109' that are concentric with the axis of the sleeve 94, and the heat covers are fitted centrally with inwardly extending tubular sleeve 119 forming lamp mountings adapted to receive and support electrode ferrules 121 secured at the opposite ends and forming a part of an elongated tubular infrared ray lamp IR of conventional construction, the same conveniently comprising a tubular quartz lamp of the sort identified as No. T-3, manufactured by General Electric Company, which has a color temperature rating of 2400° K. The sleeves 119 may comprise electrical conducting material, such as copper, the same being supported in the heat covers 113, which comprise electrical as well as heat insulating material, so that the lamp mounting sleeves may serve to electrically connect the terminal ferrules 121 of the lamp in external electrical circuitry for the delivery of energizing power to the infrared ray lamp, one of the lamp supporting sleeves 119 preferably being provided with a spring for resiliently pressing upon the end of the lamp in order to secure same snugly in mounted position. The outer ends of the lamp mounting sleeves 119 may be formed each with a circumferential outwardly facing seat 123, and cover plates 125 of relatively rigid insulating material formed with central openings sized to provide edges extending in the seats may be provided for securing the lamp mounting sleeves 119 on the heat covers 113.

While and so long as the lamp IR is appropriately energized for operation as an infrared ray emitter, the resulting radiation will be applied upon the inner black coated surface of the sleeve 94, which will absorb substantially all of the radiation emitted by the lamp. Such absorbed radiation will result in heating the sleeve substantially above the critical temperature required to produce ammonia by the decomposition of urea, whereby to develop visible images in diazotype copying sheets containing urea, or other substance capable of evolving alkaline vapors when heated.

In order to minimize heat loss from the sleeve 94 through the belt 95, a heat insulating casing, preferably comprising a layer of fiberglass insulation 127 having thickness of the order of one-half inch, may be applied upon and outwardly of the web 95. The layer 127 may extend between the inner faces of the plates 57 and 59 and may be enclosed within an outer cover layer 129 preferably comprising the same sort of Teflon impregnated woven glass fabric used for the belt 95.

One end of the cover layer 129 may be secured on a rod extending transversely between the frame plates 57 and 59, and said rod may be held at its opposite end in hooks 131 anchored on the belt clamping bar 97 at its opposite ends. The opposite end of the cover layer may extend to and be secured on the mounting means 100 at the discharge station 84. As shown, the support means 100 may comprise a cylindrical rod 133 which extends transversely between the frame plates 57 and 59 and is turnably supported at its opposite ends in bearing openings formed in the ends of a pair of arms 135, which may be formed from sheet steel and which are respectively mounted in position overlying the inner faces of the frame plates 57 and 59. The arms 135 are each pivotally supported on a rod 137 which extends between and is anchored at its opposite ends on the frame plates 57 and 59. Biasing springs on the rod 137 normally and yieldingly urge the arms in a direction on the rod 137 to press the rod 133 upon the surface of the sleeve 94. The end of the web 95 at the delivery station 84 is wrapped on the rod 133 and secured thereto by a clamping strip 139 held on the rod 133 as by fastening screws spaced at intervals along the strip and rod. The rod 133 may be adjustingly turned in its mounting openings, to tighten the belt 95 on the sleeve 94, and may be secured in adjusted position by clamp screws 141 threaded into the ends of the rod through the arms 135. The end of the cover layer 129 may be secured on a rod 143 extending transversely between the arms; and the opposite ends of the rod may be secured in openings 145 formed in the arms 135 adjacent the rod 133.

Heat sensitive means, preferably comprising a small pellet of material forming a thermistor 147, may be embedded in the web 95 between the receiving and delivery stations 83 and 84 in position to sense at all times the temperature prevailing at the surface of the sleeve 94. As a consequence, the thermistor is adapted to serve as a monitor for controlling the supply of operating energy to the lamp IR to thereby maintain within close limits the operating temperature at which heat is applied to the sensitive sheet material, as it passes from the receiving station 83 to the delivery station 84, in heat exchange relation with the outer surface of the sleeve 94. The thermistor 147 is preferably configurated as a spherical body having a flat surface formed on one side, the body being mounted in a perforation in the layer 95, with the flat surface of the thermistor in facing engagement with the sleeve remote side of the pure Teflon lining layer. Consequently, the flat side of the thermistor will be presented in position exposed to heat delivered to the lining layer at the precise temperature at which heat is applied to a sheet of sensitive material, as the same is carried around the sleeve and between it and the lining layer from the sheet receiving station 83 to the sheet delivery station 84, the thermistor 147 being, of course, provided with lead conductors 149 connected therewith and extending thence to external control circuitry designed to regulate the operation of the lamp IR.

After passing around the heating sleeve 94, a copying sheet in developed condition may be delivered at the station 84 upon a curved guide wall 151 extending transversely between and secured upon the spaced apart walls 57 and 59. One end of the guide wall extends at the sheet delivery station 84 and is formed with an offset strengthening flange 153 which may be secured, as by means of fastening screws, upon a transverse mounting bar 155 extending between and secured at its opposite ends on the walls 57 and 59, as by means of fastening screws 157, said bar also serving as a mounting for a scraper blade 159 forming an extension of the curved wall member 151 and having an edge adapted to resiliently bear upon the surface of the sleeve 94 at the delivery station 84 to guide developed copying sheets onto the wall member 151, the sleeve remote side of the scraper member 159 being formed with a flange secured upon the mounting bar 155 by the flange portion 153 of the guide wall element 151. Away from the mounting bar 155, the guiding wall 151 is curved upwardly and is inclined rearwardly toward the outlet slot or opening OC, the opposite sides of the upwardly inclined portions of the wall member 151 being formed with bracket flanges 161 which are secured, as by means of fastening screws, to the spaced apart walls 57 and 59. The rearwardly inclined sleeve remote portions of the wall member 151 define one side of a guide channel 163 outlet opening OC, the opposite side of said opening being defined by an inwardly inclined wall member 165 formed on the hinged cover C.

In order to assure positive delivery of the master and copy sheet components from the component separating apparatus SS, respectively in the sheet guiding channels 85 and 86 defined on opposite sides of the partition 81 by the wall members 85' and 86', to thereby deliver the exposed copying sheet to the developing zone DZ and to discharge the master from the apparatus through the delivery opening OM, and in order also to assure positive delivery of the developed copying sheet from the developing apparatus, at the delivery station 84, to and the discharge thereof at the delivery opening OC, a series of cooperating sheet traveling rollers 167 is provided, said rollers including at least a pair of spaced apart rollers 169 drivingly connected on a shaft 171 extending between and journaled at its opposite ends in bearings carried on the spaced frame plates 57 and 59, said shaft extending through and outwardly of the plate 59 and carrying a driving gear 173 thereon outwardly of the wall, and a driving sprocket 175 connected thereon outwardly of the gear. The shaft 171 is mounted in position extending between the wall members 85' and 151, and the opposite sides of the rollers 169 extend in appropriately spaced openings 177 and 179 formed through said wall members. The shaft 171 is also disposed in position such that the partition 81 extends tangentially of the rollers 169, the partition being formed with appropriately spaced openings 181 for accommodating the peripheries of the rollers.

The roller set 167 also includes a pair of spaced apart shafts 183 and 185 parallel with respect to and disposed on opposite sides of the shaft 171, the shafts 183 and 185 each respectively carrying a pair of spaced apart rollers 187 and 189 in position thereon for rolling engagement with the opposite sides of the rollers 169. The opposite ends of the shafts 183 and 185 are journaled in bearings 191 mounted on the support plates 57 and 59 by means of springs 193 which serve to yieldingly urge the shafts 183 and 185 toward the shaft 171, thereby pressing the rollers 187 and 189 yieldingly upon the opposite sides of the rollers 169. The rollers 169 and 187 may comprise Formica discs formed with central openings and press fitted upon ribbed portions of their carrying shafts to spline the rollers on the shafts. The rollers 189 may comprise discs of aluminum similarly splined on their carrying shaft and fitted with peripheral tire bands of resilient rubber-like material. The shaft 185 is mounted beneath the wall 86' which defines the guide channel 86 for the master component of the sandwich, on one side of the partition 81, the wall 86' being provided with suitably spaced openings for the accommodation of the rollers 189 which extend therethrough into position engaging with the peripheries of the rollers 169 in the openings formed in the partition 81. The shaft 183 is mounted above the wall member 151 to present the rollers 187 in position to rollingly engage with the surfaces of the rollers 169 which project through the roller accommodating openings in the wall member 151. The shafts 183 and 185 have ends projecting through and outwardly of the wall member 59, said projecting ends carrying gears 195 secured thereon in position making driving engagement with the gear 173 on the shaft 171.

In order to drive the rollers comprising the set 167, as well as to rotate the sleeve 94 to travel the exposed copying sheet through the developing zone DZ, and also to drive the belt elements 33 upon their support rollers 37, 39, 41 and 43, and to rotate the sleeve 21 about its axis, to constitute the same as transportation means for carrying exposure sandwiches through the exposure zone, one of the belt carrying rollers, such as the roller 39, may be connected with a driving sprocket 197 which may be drivingly connected with a prime mover, such as an electric motor 199, in any suitable or preferred fashion.

As shown, the motor may be connected with a driving pinion 201, as through suitable reduction gearing enclosed in a housing 203 connected with the motor, the pinion 201 and sprocket 197 being drivingly interconnected as by means of a chain 205. The motor 199 may be adjustably mounted on one of the frame panels P, within the housing G, as by means of anchoring bolts extending in elongated mounting slots 207 formed in the panel.

In order to drive the sheet conveying rollers 167, as well as the sleeve 94 of the developing apparatus, which are all carried on the pivotally mounted frame SA, the driving chain 205 may be drivingly connected not only with the sprocket 197, but also with a sprocket 209 journaled for turning movement about the axis of the pivot which carries the frame SA. The sprocket 209 is directly connected with a coaxial sprocket 211 which, as by means of a power transmission chain 213, is drivingly connected with the roller driving sprocket 175 and with the sprocket gear 109 which is connected with the developing sleeve 94 at one end thereof, the claim 213 entering and leaving the gear enclosing cover 113 through laterally opening channels 215 and 215' formed therein. In order to facilitate the maintenance of adequate tautness in the driving chain 213, the same may be guided around an idler sprocket 217 turnably journaled upon a bearing stud 219 that is adjustably mounted in an elongated slot 221 formed in the panel wall 59 of the sub-assembly frame.

The sprockets 209 and 211, as shown, are journaled for rotary movement on an axle pin 53' which has a threaded end secured in a clinch nut mounted in the embossment 55' of the frame plate P which supports the sub-assembly frame plate 59, said frame plate 59 being also turnably journaled on the axle pin 53'. On the opposite side of the sub-assembly, the frame plate is journaled on a pivot pin 53 which is threadedly secured in the embossment 55' of the frame plate P on which the sub-assembly frame plate 57 is supported.

The portions of the wall member 85' which extend on the side of the rollers 167 remote from the developing zone DZ may be curved upwardly adjacent the vacuum member 63 and secured to the underside of the upwardly inclined portions of the guide wall member 151, where the same forms one side of the print delivery channel OC. The vacuum member 63 also may be formed with a curved and inclined wall 152 spaced from and extending substantially parallel with the upwardly curved portions of the wall member 85' to form a guide channel 154 leading into the channel 85, behind the forward or sandwich component separating edge of the partition 81. Between the plates 57 and 59 may be fixed an upwardly and rearwardly inclined extension 152' of the curved and inclined wall 152. This extension is spaced from the portions of the wall member 85' that are fastened to the member 151 and hence define an inlet throat IT, immediately behind the print discharge outlet and over which finished prints are discharged onto the receiving tray X. If for any reason a print is delivered upon the tray in incompletely developed condition, it may be inserted through the inlet throat IT and channel 154 and redelivered to the developing zone, through the channel 85, by action of the rollers 169 and 189, for a repetition of the developing cycle, thus assuring complete development of the print.

To reveal the apparatus for inspection, repair or replacement of parts, the cover C may, of course, be swung to open position on its hinge H, which, if desired, may be of the sort permitting detachment and removal of the cover from the frame, thus giving free access to the apparatus from all sides. Since the sub-assembly frame SA is mounted on and between the frame plates P for pivotal movement about the axis of the pivot pins 53, it may be turned from its normal or operative position shown in FIG. 2, in a clockwise direction, to an elevated position overlying the top of the frame plates P, in which elevated position the bottom of the sub-assembly will be exposed upwardly.

The front, top and sides of the apparatus forming the exposure zone EZ will also be completely exposed when the sub-assembly is in elevated position. To facilitate the elevation of the sub-assembly frame, it may be provided with a lifting handle or bail LH comprising a metal strap extending between the side plates 57 and 59 and having end lugs pivotally connected with said plates. The plates 57 and 59 may be connected on the pivot pins 53 to swing outwardly of the frame plates P so that the bail may engage the top of the plates in order to support the sub-assembly thereon in elevated position.

In order to support the sub-assembly in the normal or operative position shown in FIG. 2, the frame plates P may be provided with outstanding supporting lugs SL, one of which may carry a threaded support pin SP in position to engage an edge of the plate 57 to support the sub-assembly frame in operative position, which may be adjusted by turning the pin in its supporting lug. Another of the lugs SL may carry a spring biased buffering pin BP to absorb any shock or jar that may be produced in returning the sub-assembly from raised to operating position. In order to latch the sub-assembly in operating position, one of the side plates P may be formed with a latching perforation LP in position to receive a latching finger LF on the sub-assembly frame and preferably spring biased in a direction to engage the opening when the sub-assembly is in normal operating position, the latching finger having a manually operable knob OK for disengaging the finger from the perforation against the urge of the biasing spring in order to release the latch. The side plate P, above the latching perforation, may have an inclined latch actuating cam surface LC for depressing the latch finger and guiding it into the latching perforation as the sub-assembly moves toward latched position.

As shown more particularly in FIG. 19 of the drawings, the apparatus may be energized from any suitable, preferred or convenient electrical power source connected with supply conductors L-1 and L-2. The supply conductors may be connected with the print producing apparatus through suitable overload circuit breaking means 223 connected with distribution conductors 225, 225', the drive motor 199 being electrically connected between said distribution conductors under the control of a master switch 227 and a speed controller 228, which may conveniently comprise a device of the sort manufactured by General Electric Company, as its Statotrol, Model No. 3S7507AA112B1, operable to control the speed of the motor 199 by changing voltage applied thereto as determined by an adjustable resistor 229.

The infrared lamp IR, which forms the means for heating the sleeve 94 of the developing apparatus, may be energized from the conductors 225 and 225', when the master control switch 227 is closed, under the control of a normally open, preferably double-pole switch CS, having blades 230, 230' which may be mounted upon one of the frame plates P in position to be closed and held in closed position by the cover C when the same is latched in closed position, so that the infrared ray lamp IR may not be energized unless the cover C is closed. When the master control switch 227 and the cover are in closed position, the infrared ray lamp IR may be energized for operation through conductors 231, 231' under the control of a relay switch 232 having an actuating solenoid 233. Conventional amplifying means 235 may be provided for selectively energizing the solenoid 233 under the control of the heat responsive thermistor 147, said amplifying means conveniently comprising a device of the sort manufactured by Fenwal Inc., as its Model No. 535 temperature controller, such amplifier being energized through the switch means 227 and CS, when closed, and having the thermistor 147 controllingly connected therewith, as by means of the leads 149.

The actuating solenoid 233 of the relay switch 232 may be energized under the control of the amplifier 235, as indicated by the connection of the solenoid in series with the output sides of the amplifier and between the conductors 231, 231'; and the operating characteristics of the amplifier may be varied by adjusting ganged potentiometers 237, 238 and 239, electrically connected therewith, in order to cause the switch 232 to open and close at any desired temperature level, within the operating range of the amplifier apparatus, as determined by the thermistor. In this connection, the resistors 237 and 239 may be ganged together and adjusted to determine the temperature datum from which the potentiometer 238 operates to hold the temperature level of the heat developing apparatus within a range of ±5° F. It is also convenient to gang the temperature regulating potentiometer 238 with the speed controlling resistor 229, so that the operating temperature of the developing zone may be adjusted simultaneously with adjustment of the speed of travel of the sheet to be treated through the zone.

The temperature controller 235 and associated thermistor and the adjustable potentiometers makes it possible to maintain, precisely and accurately, a desired temperature level of heat applied for the processing of sensitive material as it is carried between the inlet and delivery stations 83 and 84 of the developing apparatus. Apparatus of the sort herein disclosed not only permits the temperature level to be controlled within a 5° F. range above and below a precise desired temperature level, but also provides extremely rapid response when coupled with an infrared lamp as a heating source within a thin walled metal heating cylinder. The mounting of the thermistor upon the belt 95 in the manner described enables the sensitivity of the thermistor to be realized at optimum efficiency in determining the temperature at which heat is applied upon the sheet being processed.

The present invention also contemplates the provision of means for energizing the ultraviolet ray lamp UV for operation under the control of the switches 227 and CS. To this end, the lamp UV may be connected in series with the secondary winding of a transformer 240 and a resistor-condenser network 241 embodying a leakage resistance of relatively high value paralleled with condenser means having capacity of the order of 3 microfarads. The primary side of the transformer 240 as well as the lamp cooling blower motor 28 may be energized from the power source under the control of relays 242 and 243. These relays respectively embody switch actuating coils or solenoids 242' and 243' and double-throw switches. As shown, the relay 242 comprises a double-throw triple-pole switch having blades A$x$, B$x$ and C$x$ and cooperating contacts $a, a'$ with which the blade A$x$ alternately makes electrical contact, cooperating contacts $b, b'$ with which blade B$x$ alternately makes electrical contact, and cooperating contacts $c, c'$ with which blade C$x$ alternately makes electrical contact.

The relay 243 comprises a double-throw double-pole switch having blades D$x$ and E$x$, cooperating contacts $d, d'$ with which blade D$x$ alternatively makes electrical contact, and cooperating contacts $e, e'$ with which blade E$x$ alternately makes electrical contact. Blades A$x$, B$x$, C$x$, D$x$ and E$x$ normally have electrical connection respectively with the contacts $a, b, c, d$ and $e$ so long as the operating solenoids 242' and 243' of the relays remain de-energized. The switch blades of the relays respectively break electrical connection with contacts $a, b,$ and $c$ and with contacts $d$ and $e$, and make connection respectively with contacts $a', b'$ and $c'$ and with contacts $d'$ and $e'$ whenever and so long as the solenoids of the respective relays become and remain energized.

The relay switch blade A$x$ is electrically connected with the conductor 225' on the power source side of the switch 227, the conductor 225' being also electrically connected with one side of a time delay switch 245, the other side of which is connected with the switch contact $d'$ of the relay 243, said time delay unit preferably comprising an Amperite bi-metallic switch having an actuating coil electrically interconnected between the switch contact $a$ of the relay 242 and the switch contact $e'$ of the relay 243. The ultraviolet lamp cooling blower motor 28 may be connected in parallel with a pilot lamp 28' across the switch contacts $d'$ and $e'$ of the relay 243.

The switch blade D$x$ of the relay 243 may be electrically connected with the switch contact $b$ of the relay 242 through a resistance unit 247 having a rating of the order of six hundred ohms. The relay switch blades C$x$ and E$x$, as well as one side of the relay actuating coil 243', are electrically connected with the power conductor 231 on the source remote side of the switch 230. The opposite side of the relay actuating coil 243' may be electrically connected with the switch blade B$x$ of the relay 242 through a rectifying diode 249. a preferably electrolytic condenser 251 having a capacity of the order of two hundred and fifty microfarads being electrically interconnected between the power supply conductor 231 and the rectifier connected end of the relay actuating solenoid 243', that is to say, the condenser 251 is connected in parallel relation with respect to the coil 243'.

One side of the primary winding of the transformer 240 is electrically connected with the power conductor 231 through an adjustable resistor 253 having resistance of the order of one ohm, said side of the primary winding being also electrically connected with the switch contact $b'$ of relay 242. The other side of the primary winding of the transformer may be electrically connected with the switch contact $a'$ of relay 242. One side of the relay actuating solenoid 242' is connected with the power supply conductor 231', on the source remote side of the switch 230', the opposite side of the solenoid being electrically connected with the switch contact $c'$ of relay 242 and also with the switch contact $e$ of relay 243.

Upon closure of the master switch 227 in order to start the apparatus in operation, the cover controlled switch CS being closed, the relay actuating coil 242' will become energized, because the switch blade E$x$ is engaged with its cooperating contact $e$, thereby causing the relay switches A$x$, B$x$ and C$x$ to make engagement each with its cooperating contact $a'$, $b'$ and $c'$, while breaking electrical contact respectively with switch contacts $a$, $b$ and $c$. Engagement of the switch blade C$x$ with its associated contact $c'$ will thereafter maintain the relay coil 242' in energized condition, so long as the switches 227 and CS remain closed. Engagement of the switch blade A$x$ with contact $a'$ connects the primary winding of the transformer 240 between the power supply conductors 231 and 225' in series with the adjustable resistor 53, and consequently energizes the lamp UV for operation through the transformer 240.

The lamp cooling blower motor 28 and its pilot lamp are energized for operation after a selected time delay controlled by the adjustment of the rheostat 253 to permit the ultraviolet lamp to attain full load operating conditions at the proper vapor pressure, since premature operation of the lamp cooling blower might prevent the development of the required pressure conditions in the lamp for optimum operation. To this end, electrical engagement of the switch blade B$x$ with its associated contact $b'$ places the operating coil 243' in series with the diode rectifier 249 across the adjustable rheostat and in series circuit with the primary winding of the transformer 240. Accordingly, the relay coil 243' is energized by rectified power at a voltage of the order of six volts.

After the condenser 251 becomes fully charged, the coil 243' will become energized sufficiently to actuate the relay 243 and cause the switch blades D$x$ and E$x$ respectively to electrically connect with the contacts $d'$ and $e'$, while becoming disengaged from the contacts $d$ and $e$. Release of the contact $e$ by the switch blade E$x$ will have no effect on the solenoid 242' which remains energized because of the closure of switch blade C$x$ with its associated contact $c'$. Engagement of the switches D$x$ and E$x$ with their cooperating contacts $d'$ and $e'$, however, connects the opposite sides of the blower motor 28 and its associated pilot lamp 28' respectively with the switch contact $b$ through the resistor 247 and the switch blade D$x$, and with the power supply conductor 231 through the switch blade E$x$. Since at this stage the relay coil 242' is energized and the switch blade B is disconnected from the contact $b$, closure of the switch D$x$ with contact $d'$ merely connects one side of the blower motor 28 and its associated pilot light 28' with the contact $b$ of the relay 242.

This is the same side of the motor and pilot light circuit that is connected with the power supply conductor 225' through the bi-metallic switch 245 when the same is closed. This bi-metallic switch is of the normally closed type, which is adapted to open after a selected time delay interval when its actuating coil becomes energized. Since at this stage the actuating coil of the switch 245 is deenergized, because the switch blade A$x$ is disengaged from the relay contact $a$, the switch 245 is closed and one side of the blower motor 28 and its associated pilot light 28' is consequently connected with the power supply conductor 225'. Accordingly, the motor and pilot light will become energized upon actuation of the relay 243 and resultant connection of the other side of the motor and pilot light with the power supply conductor 231 through the contact $e'$ and the switch blade E$x$. The ultraviolet lamp cooling blower will thus be started in operation after a time delay interval following initial application of operating energy to the lamp, such interval being determined by the adjusted resistance value of the rheostat 253. After starting in operation, the blower motor 28 will continue to function so long as the ultraviolet lamp UV remains energized for operation.

Operation of the apparatus may be discontinued by opening the switch 227 or in the event that the cover C should be raised on the hinge H, thereby opening the switch CS, or otherwise in the event of power failure in the supply line through operation of the circuit protection devices 223, 223' or otherwise. In such event, the coil 242' will become deenergized and the switches A$x$, B$x$ and C$x$ will be moved into position electrically connected with the relay contacts $a$, $b$ and $c$, thereby breaking connection with the contacts $a'$, $b'$ and $c'$, and disconnecting the lamp energizing transformer 240 from the power source at the switch contact $a'$, while simultaneously connecting the operating coil of the time delay switch 245 with the supply conductor 225' through the switch contact $a$ and the blade A$x$ in electrical contact therewith, the other side of said switch operating coil being connected with the power supply conductor 231 through the switch contact $e'$ and the switch blade E$x$ in electrical contact therewith. As a consequence, the time delay switch 245 will be conditioned to open its contacts, after expiration of a selected time interval following the engagement of the switch blade A$x$ with the contact $a$, and thereby stop the blower motor 28 at the end of such interval.

The opening of the relay switch 242 at its contact $b'$ does not immediately deenergize the relay coil 243' which remains energized during a short interval as the result of the discharge of the condenser 251 through the coil upon the removal of rectified potential thereon as the result of the opening of the relay switch at its contact $b'$. Such time delay interval permits the establishment of a coil energizing circuit, in response to the engagement of the switch blade B$x$ with the contact $b$, which circuit extends from the power supply conductor 225' through the then closed time delay opening switch 245, the relay switch $d'$ and the voltage dropping resistor 247 through the closed relay switch $b$, the rectifier 249 and the relay coil 243' to the supply conductor 231. Such circuit will, of course, keep the relay coil 243' energized to maintain the tube cooling blower motor 28 and its associated pilot light in operation until the time delay switch 245 opens, under the influence of its energized actuating coil. The provision for time delayed shut-down of the blower motor 28 is to assure that the lamp UV shall become sufficiently cool to reduce its internal vapor pressure to a level which will permit it to be started in operation promptly upon reclosure of the master switch 227, which would be impossible if the lamp remained at an elevated temperature following shut-down.

The motor speed adjusting device 229 may be operated by means of a manually adjustable knob 229' mounted on the front wall W of the housing. The adjusted position of the device 229 may be indicated by a knob connected disc 255 having numbered edge graduations exposed in front of the wall W adjacent an index mark formed on a plate 257 secured on the wall at the exposed edge of the disc. The graduated edge of the disc, or the index plate, or both, may be made of translucent material, and the motor pilot lamp 71' may be mounted behind said translucent members, to indicate the operation of the motor 70. The blower motor pilot lamp 28' may be mounted behind a translucent window member 259 mounted on the wall W.

It is thought that the invention and its numerous attendant advantages will be fully understood from the foregoing description, and it is obvious that numerous changes may be made in the form, construction and arrangement of the several parts without departing from the spirit or scope of the invention, and without sacrificing any of its attendant advantages, the form herein disclosed being a preferred embodiment for the purpose of illustrating the invention.

The invention is hereby claimed as follows:

1. Apparatus for exposing materials to the action of ultraviolet radiation comprising an ultraviolet ray emitting lamp, circuitry for applying electrical power to energize the lamp for operation, including switching means for controlling the delivery of operating energy to the lamp, means operable to circulate a cooling medium in heat exchange relation with respect to the lamp, electrical control means energized from a suitable source for automatically initiating circulation of the cooling medium following a delay interval after the lamp is started in operation, and for continuing the circulation during an interval following termination of lamp operation.

2. Apparatus as set forth in claim 1, wherein the control means includes a relay having an actuating coil for starting and stopping the circulation of the cooling medium, and a condenser connected with the coil for maintaining the coil of the relay energized during a delay interval following its disconnection from its energizing source, and means operable upon delivery of operating energy to the lamp for applying condenser charging and relay coil energizing power upon the condenser and coil.

3. Apparatus as set forth in claim 2, including rectifying means for applying unidirectional electrical power upon the coil and coil connected condenser for the operation of the same.

4. Apparatus as set forth in claim 2, including an adjustable rheostat connected in the relay coil energizing circuit to determine the duration of the delay interval.

5. Apparatus as set forth in claim 1, wherein the control means includes a normally closed, time delay opening switch, and means operable to connect the same in a circulation maintenance circuit, upon termination of lamp operation, to thereby continue circulation of the lamp cooling medium during an interval until the time delay switch opens.

6. Apparatus for exposing material to the action of heat comprising an electrically energized heater, means for energizing said heater including first, manually adjustable electric control means for setting the temperature at which said heater is energized, electric motor-driven means for moving material to be heated into and out of heat exchange relationship with said heater, and second, manually adjustable electric control means ganged with said first control means for regulating the speed of said electric motor, and thereby movement of said material, upon manual adjustment of said first control means to provide change of rate of material movement by said electric motor-driven means as a function of the adjusted operating temperature determined by said first control means.

References Cited

UNITED STATES PATENTS 3,207,896   9/1965   Meaney et al. _____ 95—77.5 XR

NORTON ANSHER, *Primary Examiner.*

G. M. HOFFMAN, *Assistant Examiner.*